United States Patent [19]
Hagenlocher

[11] Patent Number: 5,285,986
[45] Date of Patent: Feb. 15, 1994

[54] RIGID AIRSHIP WITH A CARRIER FRAME OF RIBS AND BEAMS ENCLOSED BY SKIN SECTIONS FORMING AN ENVELOPE

[75] Inventor: Klaus Hagenlocher, Friedrichshafen, Fed. Rep. of Germany

[73] Assignee: Luftschiffbau Zeppelin GmbH, Friedrichshafen, Fed. Rep. of Germany

[21] Appl. No.: 869,645

[22] Filed: Apr. 16, 1992

[30] Foreign Application Priority Data

Apr. 18, 1991 [DE] Fed. Rep. of Germany .... 4112621.1

[51] Int. Cl.⁵ .............................................. B64B 1/06
[52] U.S. Cl. ..................................... 244/97; 244/125; 244/126; 244/30
[58] Field of Search ............... 244/126, 128, 131, 125, 244/24, 30, 96, 97

[56] References Cited

U.S. PATENT DOCUMENTS

| | | | |
|---|---|---|---|
| 1,081,794 | 12/1913 | Vaniman | 244/126 |
| 1,642,024 | 9/1927 | Helma | 244/125 |
| 1,724,009 | 8/1929 | Eckener | 244/128 |
| 1,860,555 | 5/1932 | Schlosser | 244/128 |
| 1,981,600 | 11/1934 | Letourneur | 244/128 |
| 2,451,815 | 10/1948 | Donnell et al. | 244/96 |
| 3,180,590 | 4/1965 | Fitzpatrick | 244/30 |
| 3,391,883 | 7/1968 | Curtis . | |
| 3,508,999 | 4/1970 | Webb et al. . | |
| 3,871,603 | 3/1975 | Menke et al. | 244/125 |
| 3,972,492 | 8/1976 | Milne | 244/30 |
| 4,032,086 | 6/1977 | Cooke . | |
| 4,265,418 | 5/1981 | Eymard | 244/125 |
| 4,434,958 | 3/1984 | Rougeron et al. . | |

FOREIGN PATENT DOCUMENTS

| | | | |
|---|---|---|---|
| 1159034 | 12/1983 | Canada | 244/126 |
| 20031981 | 7/1981 | European Pat. Off. . | |
| 216657 | 7/1908 | Fed. Rep. of Germany . | |
| 235209 | 7/1910 | Fed. Rep. of Germany . | |
| 280862 | 5/1913 | Fed. Rep. of Germany . | |
| 949986 | 3/1956 | Fed. Rep. of Germany . | |
| 2934902 | 12/1980 | Fed. Rep. of Germany . | |
| 4018749 | 12/1991 | Fed. Rep. of Germany . | |
| 211334 | 2/1924 | United Kingdom | 244/125 |

Primary Examiner—Michael S. Huppert
Assistant Examiner—Anne E. Bidwell
Attorney, Agent, or Firm—W. G. Fasse

[57] ABSTRACT

An airship has a carrier frame with triangular cross-ribs arranged so that an apex faces upwardly and a base faces downwardly, whereby longitudinal beams at the corners of the triangles interconnect the cross-ribs. The carrier frame is enclosed by an envelope including at least three skin segments joined to each other along seams coinciding with the longitudinal frame beams. Each skin segment extends entirely from the bow to the stern and may include several strips. At least two steering air chambers are provided, one near the bow, the other near the stern for trimming purposes. The seams or at least one of the seams, is so constructed that it is readily openable and closable for providing access to the interior of the airship.

21 Claims, 6 Drawing Sheets

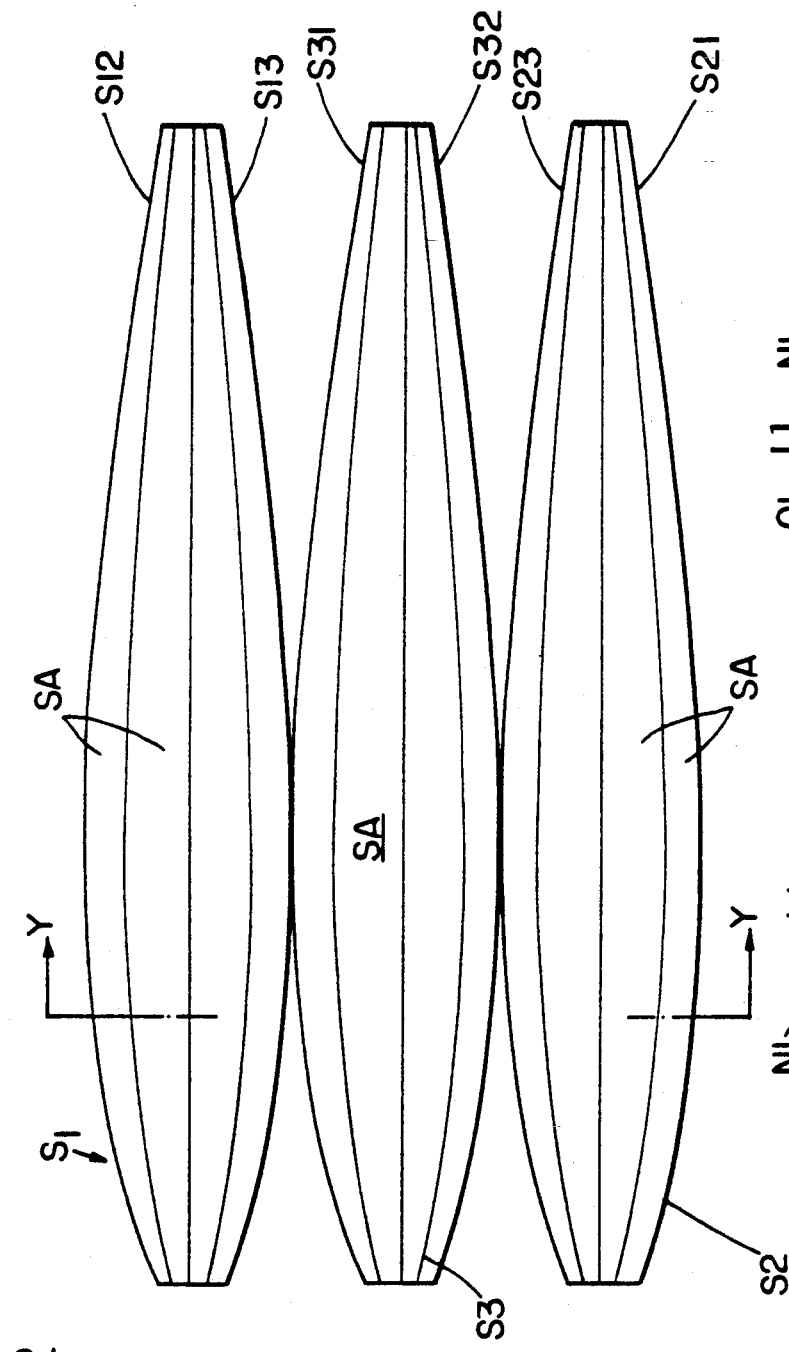

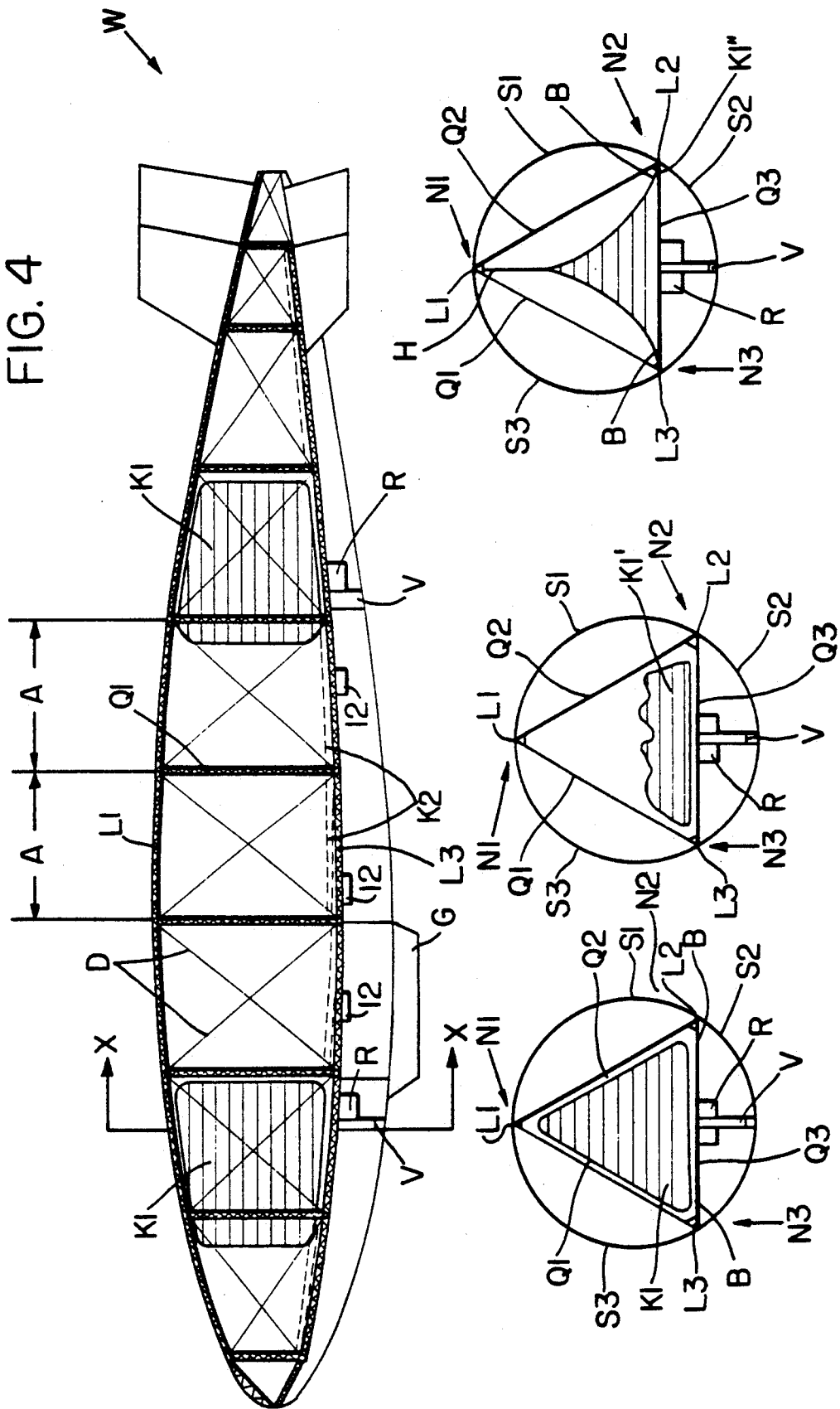

RIGID AIRSHIP WITH A CARRIER FRAME OF RIBS AND BEAMS ENCLOSED BY SKIN SECTIONS FORMING AN ENVELOPE

CROSS-REFERENCE TO RELATED APPLICATIONS

The present invention is related to U.S. Ser. No. 07/712,269, (Hagenlocher et al.), filed Jun. 7, 1991, now U.S. Pat. No. 5,110,070, issued: May 5, 1992.

FIELD OF THE INVENTION

The invention relates to a rigid airship with a carrier frame formed of triangular cross-ribs and longitudinal beams interconnecting the cross-ribs. The so-formed carrier frame is enclosed by skin sections interconnected along seams to form a closed envelope.

BACKGROUND INFORMATION

U.S. Ser. No. 07/712,269 now U.S. Pat. No. 5,110,070, issued on May 5, 1992 (Hagenlocher et al.) discloses a rigid airship in which triangular cross-ribs are interconnected by longitudinal beams which together with the cross-ribs form a carrier frame enclosed by an envelope or skin. Carrier gas cells and other structural components of the airship are mounted within the carrier frame which is divided into longitudinal sections, each of which is formed by two cross-ribs and three longitudinal beam elements. Each cross-rib is formed by three rib elements, at least two of which are of equal length forming a isosceles triangle, the tip of which points upwardly, and the base of which extends near the bottom of the airship horizontally. The corners of the isosceles triangles are interconnected by the beam elements forming the longitudinal beams. The rectangular areas bounded by two rib elements and by two beam elements are reinforced by diagonally extending tensioning elements, for example, a cable with a turnbuckle. Inflatable and deflatable air chambers are provided for steering purposes in addition to inflatable lifting gas cells.

The features disclosed in U.S. Ser. No. 07/712,269 (Hagenlocher et al.) combine the advantages of a rigid airship with the advantages of a blimp, while avoiding the disadvantages of both types of structures. Such advantages are desirable because, in spite of the great advances that have been made in aircraft constructions, there are several fields of application in which the use of an airship is much more advantageous than the use of an aircraft, such as a helicopter. Such advantages are especially important, for example, when an airship must cruise at a low speed over the destination after arrival or where even a prolonged localized hovering may be required for the accomplishing of a specific task.

Airships with a rigid frame are usually referred to as rigid airships which have certain technical advantages over blimps, especially with regard to their steerability. Nevertheless, rigid airships are frequently not used because they are substantially more expensive than non-rigid pressurized airships. Thus, instead of using a rigid airship, non-rigid pressurized airships are used because they are substantially smaller and less expensive.

The construction of a rigid airship requires the formation of a trusswork that includes the cross-ribs and longitudinal spars or beams. Such a construction is labor intensive and additionally results in a substantial weight of the carrier frame. These structural efforts and expenses frequently outweigh the advantages of a rigid airship, namely its steerability, even if there is a pressure drop within the envelope and its high travel speed and its low fuel consumption. Thus, the construction of rigid airships heretofore was feasible only in an economical sense if the total carrier volume of the ship was exceeding about 25,000 cubic meter. For these reasons, non-rigid pressurized airships have been used in practice heretofore.

However, pressurized airships have substantial disadvantages. When a pressure drop occurs in the pressurized envelope or skin, such blimp-type airship is no longer steerable. Additionally, due to the pressurization of the envelope, it is not practically possible to maintain an aerodynamic shape. The resulting higher drag values for pressurized airships dictate a smaller travelling speed combined with higher fuel consumption. Moreover, the use of pressurized airships is very much dependent on whether conditions such as strong wind or thunderstorms which limit the use of pressurized airships in practice. Still another disadvantage is seen in that due to the lack of a carrier frame it is necessary to mount the propulsion plants to the gondola, whereby the noise and vibration level in the gondola is quite substantial.

As mentioned above, the construction of a rigid airship as disclosed by Hagenlocher et al. wants to combine the advantages of both types of airships while avoiding their disadvantages. The carrier frame of Hagenlocher et al. has a substantially reduced weight so that it becomes feasible for use in rigid airships having a smaller carrier gas volume than was conventionally possible or economically feasible. Thus, Hagenlocher et al. make it possible to incorporate the positive characteristics of rigid airships into such ships with substantially smaller carrier gas volumes. In fact, the structural weight of rigid airships according to Hagenlocher et al. can be reduced to about fifty percent of comparable conventional rigid airships. A carrier gas volume of about 12,000 cubic meter is quite feasible for a rigid airship constructed as disclosed by Hagenlocher et al. while simultaneously achieving the desirable advantages of a rigid airship, for example, an aerodynamic shape, high cruising speeds, and low fuel consumptions with an increased safety and continued steerability, even when there is a pressure loss in a carrier gas cell.

The outer contour in conventional rigid airships is determined by ring-shaped or polygonal cross-ribs. This conventional feature requires that the skin or envelope is applied to the circumference of the frame in the form of individual ring webs which then must be stretched. Once the ring webs are applied to the frame, circumferential seams must be formed to interconnect the ring webs. A plurality of carrier gas cells are arranged inside the finished skin or envelope. Such a construction of the skin out of ring-shaped webs has its disadvantages, especially for the intended combination of the features of a rigid airship with those of a pressurized airship, whereby only a single carrier gas cell is present, namely that formed by the outer envelope. The mounting of ring-shaped envelope webs or portions onto the triangular structure of the carrier frame is hard to accomplish especially if it is necessary that the finished envelope shall have a circular cross-section to form the inflatable carrier gas envelope. Another disadvantage of such a skin construction made of a plurality of ring webs resides in the fact that the accessibility to the interior of the airship, for example, for maintenance purposes, is made more difficult by the circumferentially closed ring webs.

It is customary to use so-called ballonets in pressurized airships. These ballonets are air chambers that can be inflated and deflated as required for steering purposes. However, such air chambers for steering purposes must be arranged inside the carrier gas envelope, whereby the steering air chambers are conventionally secured to that portion of the carrier gas envelope which faces the airship gondola. This type of installation of the steering air chambers is not possible in a carrier frame as suggested above, due to the construction of the carrier frame.

OBJECTS OF THE INVENTION

In view of the above it is the aim of the invention to achieve the following objects singly or in combination:

to improve a rigid airship of the Hagenlocher et al. construction in such a way that the manufacturing and assembly of the airship skin is simplified by avoiding ring-shaped envelope sections;

to make it possible to install the steering air chambers within the skin in the most efficient position without any difficulties;

to provide easy access to the interior of the airship for maintenance and repair work;

to construct the skin of a rigid airship in such a way that it is easily secured to the carrier frame and equally as easily removed again, for example, for shipping purposes; and to arrange the steering air chambers in such a way that they can cooperate with the lift gas for a sensitive control of the location of the lift center of gravity by influencing the steering air chambers, for example, by a blower and pressure regulator.

SUMMARY OF THE INVENTION

A rigid airship according to the invention is characterized by the following features. The envelope forming the skin is divided into at least three skin segments extending all the way from the bow to the stern. The at least three skin segments supplement each other to form the full envelope all around the circumference of the airship. The three skin segments are interconnected along longitudinal attachment seams extending over the entire length of the airship along the longitudinal rigid beam or spar elements in a force transmitting manner. The seams are secured to these longitudinal beam elements, whereby the skin segments take up a proportion of all forces introduced into the airship and enclose the carrier gas volume of the airship and whereby the skin segments assume the required shape of the airship when filled with carrier gas. A steering air chamber is arranged in the bow portion and in the tail portion of the airship in such a way that the respective steering air chamber rests on diagonal tensioning elements interconnecting two neighboring triangular cross-ribs at the triangular base. The steering air chambers are so constructed that in the inflated state the steering air chambers fill the triangular cross-section of the prism shaped carrier frame.

The number of skin segments is not critical. However, three skin segments are preferred. In any event, all skin segments are cut so that they supplement each other to form the full envelope with a circular cross-section when the envelope is inflated. The individual skin segments are secured with their longitudinal edges along the entire length of the airship to each other and an outer mounting surface of the respective longitudinal beams or spars whereby the skin segments are stretched in the longitudinal direction. With this construction the seam between the two neighboring skin segments and the longitudinal beams coincide with each other. When the envelope is not inflated, the segments remain without any tension in the circumferential direction. Only when the carrier gas is filled into the envelope of the airship, will the individual skin segments assume a tensioned state, thereby forming the above mentioned circular cross-section of the airship.

One flexible air chamber, forming a steering or control chamber, is arranged in a bow portion, another in a stern portion of the airship inside the space having a triangular cross-section and a prism configuration formed by two neighboring triangular cross-ribs and by the respective longitudinal beam elements. In its fully inflated condition the steering air chambers completely fill the triangular cross-section of the carrier frame, whereby the respective steering air chamber is surrounded by carrier gas on all sides when the airship is inflated with carrier gas. Due to this construction and due to the flexibility of the steering air chambers, the latter are capable of transmitting the internal pressure of the air chambers onto the carrier gas surrounding these air chambers in their filled condition. The longitudinal side surfaces of the steering air chambers rest entirely on the rectangular surfaces formed between the longitudinal beam elements and the respective cross-rib elements. These air chamber surfaces also rest against the diagonal tensioning elements interconnecting neighboring cross-ribs. This arrangement of the steering air chambers makes it possible to use simple securing devices attaching the chambers to the carrier frame on the base surface formed by the triangle base of the cross-ribs and the respective lower longitudinal beam elements. The remainder of the steering air chambers, namely the upwardly reaching walls are freely movable within the prism space having the above mentioned triangular cross-section. This free movement is advantageous for the filling or discharging of air from these steering air chambers, because due to the flexibility of the walls of these chambers, the latter can easily unfold during air filling and fold again during air discharge. Movable connections may provide a controlled folding.

The just described arrangement of the steering air chambers within the carrier frame provides the further possibility to adapt the volume of the steering air chambers to different steering requirements simply by selecting the proper length of the respective steering air chamber within the triangular space formed by the carrier frame. Preferably, the entire volume of the steering air chambers is within the range of twenty-five percent to about thirty-three percent of the entire volume of the airship. Due to the subdivision of the skin segments according to the invention for forming the envelope it is easy to provide access to the interior of the airship simply by loosening the connection of a longitudinal seam from the respective longitudinal beam element. Thus, easy access is also provided to the steering air chambers. Another advantage of this construction is seen in that the airship envelope can easily be removed from the carrier frame, for example, for transport purposes.

BRIEF DESCRIPTION OF THE DRAWINGS

In order that the invention may be clearly understood, it will now be described, by way of example, with reference to the accompanying drawings, wherein:

FIG. 2 shows a developed view of the three skin segments forming the airship envelope according to the invention;

FIG. 3A shows a sectional view along section line Y—Y in FIG. 2, illustrating the deflated state of the skin sections;

FIG. 3B is a sectional view as in FIG. 3A, however showing the inflated state of the skin sections;

FIG. 4 is a longitudinal vertical section through an airship according to the invention illustrating the location of the steering air chambers;

FIG. 5A is a sectional view along section line X - X in FIG. 4, showing the position of an inflated steering air chamber;

FIG. 5B is a view similar to FIG. 5A, but showing a partially deflated steering air chamber;

FIG. 5C is a view similar to that of FIG. 5B, but showing a partially deflated steering air chamber, the apex of which is secured to the top longitudinal beam or spar by an elastic suspension;

DETAILED DESCRIPTION OF PREFERRED EXAMPLE EMBODIMENTS AND OF THE BEST MODE OF THE INVENTION

Figure 1:
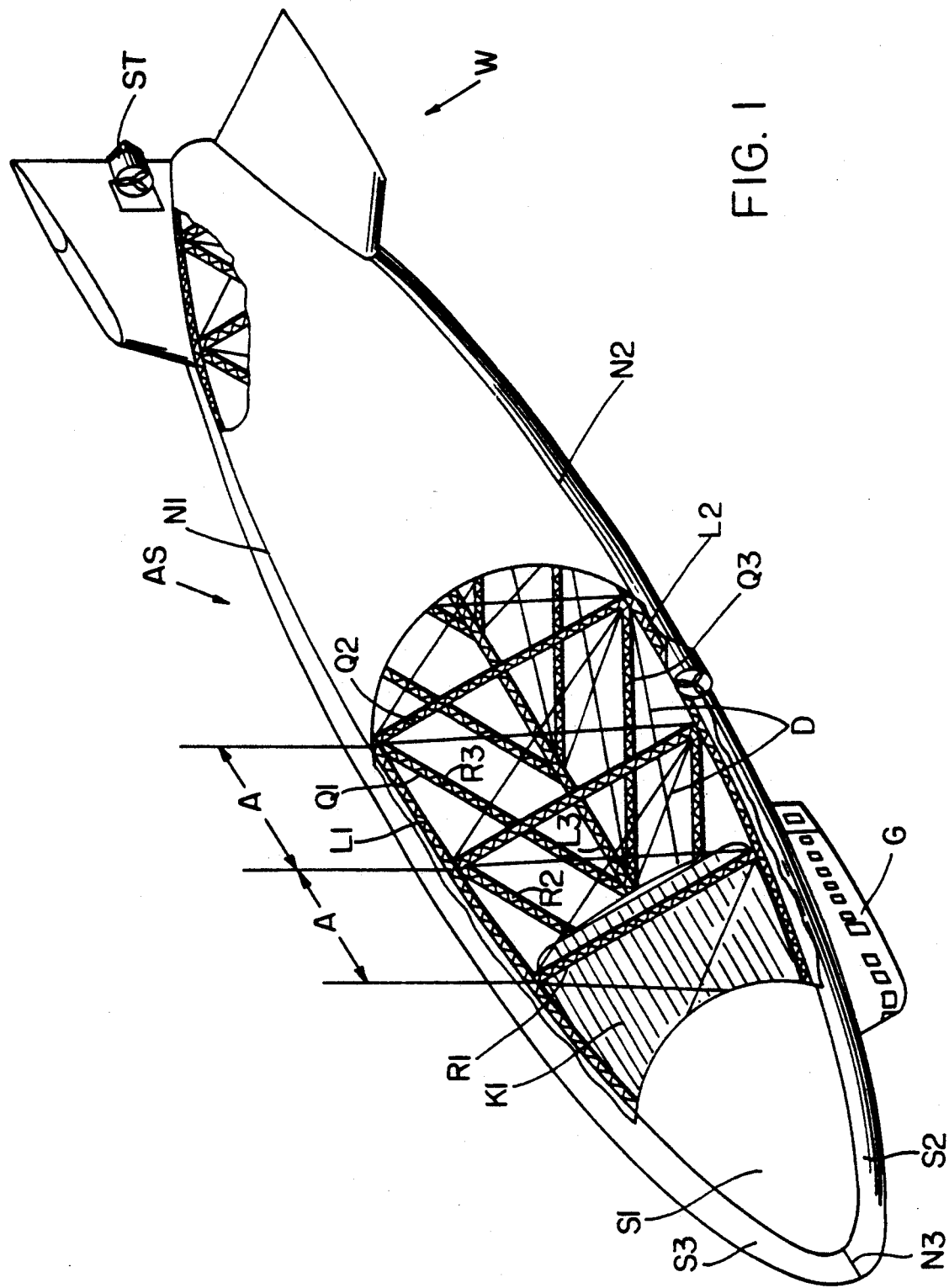
FIG. 1 shows a perspective view of an airship according to the invention, with the envelope partially removed to reveal the internal construction.

The perspective view of FIG. 1 shows an airship AS, the skin of which has been partially removed to reveal the frame construction according to the above mentioned copending Patent Application (Hagenlocher et al.) and to show the position of at least one flexible steering air chamber K1. The carrier frame is divided into sections A each formed b two neighboring cross-ribs R1, R2, R3 and three longitudinal rigid beam elements L1, L2 and L3. Each cross-rib R1, R2, R3 comprises three rib elements Q1, Q2, and Q3. These rib elements may be all of equal length to form the respective cross-rib as an equilateral triangle or the third rib element Q3 may have a different length while the first and second rib elements Q1 and Q2 have the same length to form an isosceles triangle. The rib elements and the longitudinal rigid beam elements are interconnected at the corners where they meet as described in more detail in the above mentioned copending Application (Hagenlocher et al.). The longitudinal rigid beam elements L1, L2, and L3 define the outer contour of the envelope surface of the airship. Each frame section forms three rectangular surfaces, each bounded by two neighboring rib elements Q1, Q2, Q3, and by two beam elements L1, L2, L3. Tensioning members D are located in these rectangular surfaces and extend diagonally from corner to corner to provide an improved stability and strength for the carrier frame. The longitudinal, or rather axial length of the frame sections A may be the same for all sections or they may differ from one another, depending on the length of the respective rigid beam elements L1, L2, L3.

FIG. 1 also shows a gondola G secured to the carrier frame as described in more detail in the above mentioned copending application. A tail unit W carrying a steering propulsion plant ST is secured to the stern of the frame.

The flexible steering air chamber K1 partly visible in FIG. 1 has a triangular cross-section in accordance with the respective cross-ribs and its configuration may taper in the forward direction. When the chamber K1 is inflated, its flexible walls will contact the respective rib elements R1, R2, R3 and also the diagonal tensioning elements D.

Each of the three skin segments S1, S2, and S3 may be assembled of a plurality of narrower skin strips SA. FIG. 2 shows that each skin segment S1, S2, S3 includes, for example, four skin strips SA. These strips SA are secured to each other in such a way that the resulting skin segment already has the three-dimensional curvature required for forming the complete envelope. The connection of the strips SA to each other may, for example, be accomplished by adhesive bonding or the like. The just mentioned three-dimensional curvature is such, that the resulting segments S1, S2, S3 will have the required circular cross-section perpendicularly to the longitudinal axis of the airship along the entire length of the airship. The longitudinal junction between the skin segments S1 and S3 will form an attachment seam N1. A further attachment seam N2 is formed between the segments S1 and S2. A third attachment seam N3 is formed between the segments S2 and S3. Seams N1 and N2 are visible in FIG. 1, but seam N3 is only partially visible in FIG. 1. When the skin segments S1, S2, and S3 are joined to each other, the segment edge S13 and S31 form the above, mentioned attachment seam N1 while the segment edges S12 and S21 form the attachment seam N2 and the segment edges S32 and S23 form the attachment seam N3. However, one seam remains initially open, whereby it is possible to pull the entire envelope over the carrier frame in such a way that each seam is aligned in the longitudinal direction with the respective longitudinal frame beam.

In the present example embodiment as shown in FIG. 1, the rib elements Q1, Q2, and Q3 are all of equal length, whereby each cross-rib R1, R2, R3 forms an equilateral triangle. However, the invention is not limited to ribs forming an equilateral triangle. Rather, isosceles triangles are equally useful for the present purposes. In those embodiments in which the cross-ribs form isosceles triangles, it is necessary to cut the skin segments accordingly. In other words, the skin segment covering the base of the frame and thus the bottom of the airship will be either wider or narrower than the other two skin segments. The mounting of the skin segments remains the same and no difficulties are encountered when the bottom segment has different dimensions than the other two segments. It is only essential that the seams are aligned with their respective longitudinal beam each of which has a radially outwardly facing mounting surface to which the respective attachment seam N1, N2, N3 is attached in a force transmitting manner as will be described below with reference to FIGS. 7, 8 and 9.

Referring to FIGS. 3A and 3B, the mounting of the skin segments will now be further explained. Since, as mentioned above, the triangles of the ribs are all equilateral triangles, the three skin segments S1, S2, and S3 all have the same shape and configuration and the same dimensions. As seen in the FIGS. 3A and 3B each skin segment covers 120°. As seen in FIGS. 3A and 3B, the rib R1 is formed by the three rib elements Q1, Q2, and Q3. The longitudinal rigid beam elements L1, L2, and L3 are secured to the corners of the triangle. The first step is to pull the skin segments longitudinally over the frame structure under tension so that the attachment seam N1 is aligned with the flat mounting surface of the longitudinal rigid beam L1 and the attachment seam N3 is aligned with flat mounting surface of longitudinal beam L3. The attachment seam N2 between the skin segment edges S12 and S21 is still open. At this time, only longitudinal tension is applied to the seam N1 and N3 while the skin segments S1, S2, and S3 are still flabby as shown in FIG. 3A, which also shows the individual skin segment strip SA. As shown in FIG. 2, each skin segment has, for example, four strips SA joint to each other. However, the number of these strips is not critical.

Since the attachment seam N2 is still open, there is easy access along the entire length of the frame to the interior of the frame. Thus, installations and further work can be performed inside the frame structure. Once these operations are completed, the attachment seam N2 is also closed, whereby the two segments edges S12 and S21 of the two segments S1 and S2 are interconnected with each other along the longitudinal frame rigid beam L2 as will be described in more detail below with reference to FIGS. 7, 8, and 9.

FIG. 3B shows the same cross-section as FIG. 3A, however now with the airship envelope inflated. It is assumed that the carrier gas cell is fully inflated and tensioned, whereby the closed circular configuration shown is obtained. Due to the inflation of the envelope in combination with the securing in a force transmitting manner of the attachment seams N1, N2, and N3 to the respective radially outwardly facing mounting surface of the longitudinal rigid beams L1, L2, and L3, a good stiffening is imparted to the entire airship. More specifically, due to the fact that the interconnected skin segments S1, S2, and S3 form only a single carrier gas cell, which is under an internal pressure only slightly higher than the external pressure, the entire interconnection of the carrier frame is stiffened and additionally, the loads to which the carrier frame may otherwise be exposed, are reduced because the envelope itself takes up a substantial proportion of all the forces introduced into the airship.

Due to the connection of the airship envelope with the carrier frame along the longitudinal carrier beams, all aerodynamic forces effective on the envelope are introduced into the carrier frame. The envelope itself is thus exposed only to the pressure head and to the internal pressure. All other loads such as are caused by the dead weight, the propulsion thrust, steering forces generated by the tail assembly and so forth are taken up directly by the carrier frame which is supported by the airship envelope which in turn is supported by the internal pressure. The slender cross-ribs and slender longitudinal beams are exposed primarily to tension stress by the envelope which itself is also exposed to tension or membrane stress. Stated differently, the tension stress in the envelope is superimposed on any compression stress occurring in the cross-ribs and longitudinal beams, whereby the compression loads are either compensated or at least reduced. During the operation when the envelope is inflated, the carrier frame is exposed to relatively low loads which has the advantage that the carrier frame can be dimensioned with due regard to the lightweight requirements.

FIG. 4 shows a vertical longitudinal section through the airship, whereby the longitudinal sections A of the air frame are particularly visible. Although sections A are shown to have equal length, such a construction is not necessary and the sections may have different axial lengths. The outer chord of the longitudinal beams have a curved configuration to provide the required aerodynamic shape without any drag increasing features. The tensioning elements D are also illustrated in FIG. 4 as running diagonally across the respective rectangular surfaces mentioned above.

Steering air chambers K1 are arranged near the bow and near the stern inside the triangular carrier frame structure of the airship. The steering air chambers K1 are filled with air to desired pressures and emptied again for the purpose of facilitating the steering of the airship. For this purpose the chambers K1 are equipped individually with a blower V and with a pressure regulator R.

A second type of air chamber K2, provided for the purpose of facilitating the filling and discharging of the airship envelope with carrier gas, is located as shown in FIG. 4 primarily in the center portion of the airship. In order to distinguish the air chambers K1 from the air chambers K2, the chambers K1 are shaded with horizontal lines. The blowers V and the pressure regulators R enable the precise control of the internal pressure in the steering air chambers K1 relative to the external pressure and to keep the pressure inside the chambers K1 constant. The length of the chambers K1 does not need to coincide with the length of the individual airship sections A. Depending on the required volume of the air chambers K1, the latter may be shorter or longer than the sections A. FIG. 4 shows that the chambers K1 are longer. The length of the chambers K1 will be primarily determined by the preferable volume ratio between the steering air chambers K1 and the total volume of the envelope of the airship. The total volume of the air chambers K1 to the total volume of the envelope should be within the range of about one quarter to one third. The lateral or longitudinal walls of the air chambers K1 rest against the tensioning elements D. If desired, and if required, a net Z shown in FIG. 6 may be stretched across the rectangular surfaces mentioned above to provide additional support for the walls of the steering air chambers K1.

The steering air chambers K1 are so constructed and dimensioned that in their completely inflated condition they fill the free cross-sectional area of the triangular carrier frame as shown in FIG. 5A, where the air chamber K1 is also shaded with horizontal lines.

In FIG. 5B the air chamber K1 is shown as partially deflated at K1'. The downwardly facing wall of the air chamber K1 is lashed or tied to the lower horizontal base or rib Q3 of the respective cross-rib. FIG. 5B shows that the lateral walls of the air chamber K1' can fold downwardly as the chamber is being emptied. Thus, the empty chamber K1' forms a relatively small package resting on the horizontally extending cross-tensioning elements D and, if provided on a respective net Z.

FIG. 5C shows a somewhat different construction in which the apex of the air chamber K1" is secured by an elastic holding member H to the top longitudinal beam L1. In that case, the emptying of the chamber K1" will result in a bulging of the lateral chamber walls inwardly and downwardly as shown in FIG. 5C.

By lashing or tying the lower chamber wall to the cross-ribs and possibly also to the longitudinal rib sections, it is assured that the chambers K1, K1', K1" cannot be displaced in an undesirable manner in the longitudinal direction. The lashing may be accomplished by ropes extending through eyelets and such ropes are shown at B in FIGS. 5A and in FIG. 6.

Figure 6:
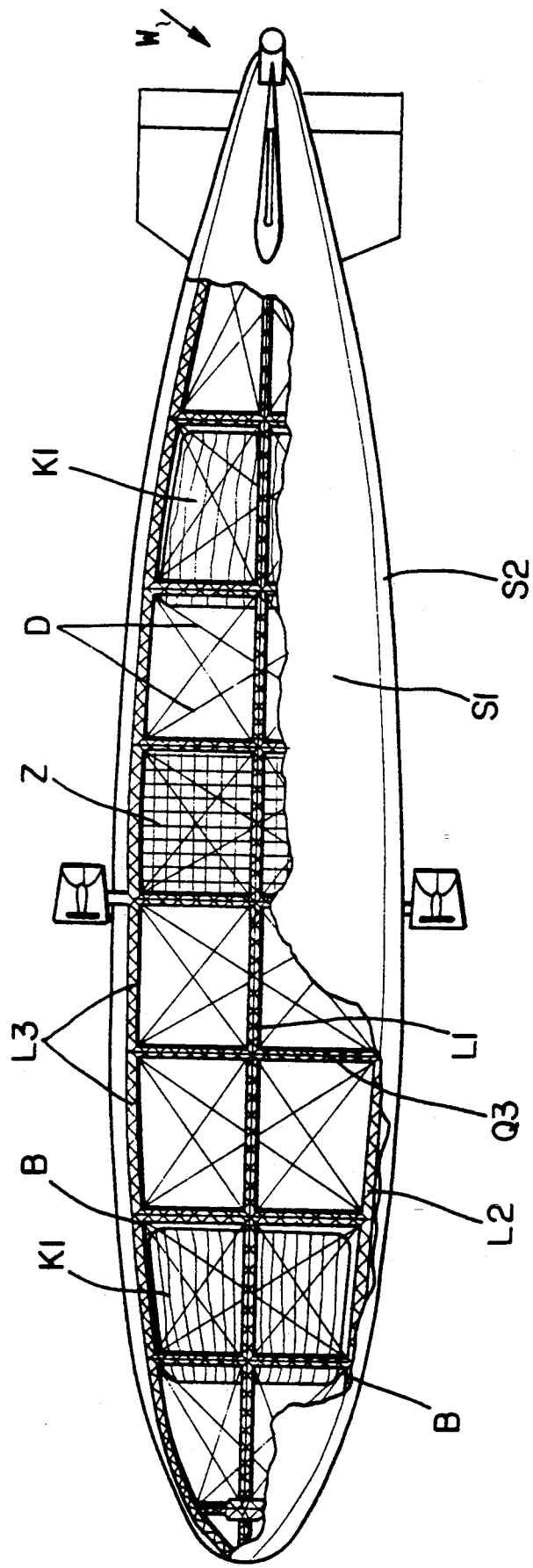
FIG. 6 is a partial horizontal section through an airship according to the invention.

FIG. 6 shows a horizontal section through the airship. The steering air chambers K1 are again shown by horizontal wavy shading lines. The net Z may be provided for all of the air chambers if desired. The carrier gas entirely envelopes or surrounds the chambers K1 and the chambers K2 provided for aiding in the filling or discharging of carrier gas. The chambers K2 are indicated by dashed lines K2 in FIG. 4 showing that the chambers K2 are not filled with air when they are empty as shown in FIG. 4. The air chambers K2 do not require walls of a material as strong as that needed for the chambers K1, because the latter are filled with an excess pressure while the air chambers K2 do not hold an excess pressure filling. Hence, a lightweight film material reinforced by a fabric laminated between two synthetic material films is satisfactory for the walls of the chamber K2. On the other hand, the walls of the chambers K1 are made of similar, but heavy-duty material of plastic films reinforced with several fabric layers to form a laminate. By making only the chambers K1 of heavy-duty material and the chambers K2 of lightweight material, the total dead-weight of the airship is also reduced.

Let it be assumed that for a flight at an altitude of 2300 m, the airship envelope is filled with a carrier gas which takes up 80% of the entire volume of the envelope. Each steering air chamber K1 is filled with air by the blower V through the pressure regulator R until an excess pressure of about 5 mbar is achieved relative to the atmospheric pressure. The pressure regulator R maintains the pressure in the chambers K1 at this pressure level, whereby the chambers K1 are filled to about two thirds of their full volume. The internal excess pressure in the chambers K1 is transmitted through the walls of the air chambers K1 to the carrier gas volume in the airship envelope. As a result, it is possible to weight trim the airship with the aid of the steering air chambers K1. For example, if the airship is bow heavy, the pressure in the forward chamber K1 will be reduced, whereby its volume is correspondingly reduced and the volume of the stern steering air chamber is correspondingly increased. This shifting of air from the forward air chamber K1 to the stern air chamber K1 and vice versa can take place automatically. For this purpose the chambers are interconnected by respective valves. The blowers V and the pressure regulator R may be employed for safety purposes and for maintaining the excess pressure constant in the respective chamber once the trimming is completed. In other words, one chamber may have a slightly larger constant excess pressure than the other or vice versa. As a result, the two steering air chambers K1 will have different volumes. Further, the carrier gas is freely movable around these chambers K1 so that the carrier gas is respectively displaced with the help of the control of the pressure in the chambers K1. Accordingly, a fine adjustment of the lift center of gravity of the airship is possible by means of the pressure control in the chambers K1.

During level flight the pressure in the chambers K1 is kept constant at the above mentioned range of about 4 to 5 mbar in excess over the atmospheric pressure. When the airship rises to higher altitudes, the carrier gas expands in the envelope and displaces the air out of the steering air chambers K1. When a certain altitude is reached, the chambers K1 may be completely empty and hence pressed together and folded to rest on the floor formed, for example, by the above mentioned net Z. When the chamber walls of the chambers K1 reach this completely discharged position the permissible flight altitude is reached. One-way valves, for example, as part of the pressure regulators R are provided to permit the discharge of air from the chambers K1 as the airship rises. As mentioned above, FIG. 5A shows the complete filling of the chambers 1 when the ship is on the ground. FIGS. 5B and 5C show a partial discharge at a certain altitude less than the permissible altitude. When the permissible altitude is reached these chambers K1 are substantially completely emptied.

The inflating of the airship with the carrier gas such as helium takes place according to a special procedure. Mixing of the helium with air must be avoided. For this purpose, the air chambers K2 are provided which are distinct from the steering air chambers K1. Initially, all air chambers K1 and K2 are empty in the free space inside of the carrier frame. Both types of air chambers K1 and K2 are lashed or tied to the frame structure so that they cannot lift off, so to speak, from their supporting frame surface. The empty chambers K1 and K2 are then completely filled with air so that the triangular cross-sectional area in the cross-ribs of the frame is completely filled in. Thereafter, any air present in the envelope of the airship is pumped out of the envelope, whereby the airship outer envelope will be caused to closely hug the surfaces of the chambers K1 and K2 with a force extending from the outside inwardly. Next, the carrier gas is filled into the airship envelope, whereby air from the air chambers K2 is permitted to escape to the outside. As a result, when the airship is completely filled with the carrier gas, the latter will not be contaminated by air. The air chambers K2 are now completely empty and rest in a folded state on the respective rectangular support surfaces of the frame structure. The folded state is shown by dashed lines at K2 in FIG. 4. At this time, the airship has its final external configuration. With the aid of the steering air chambers K1, it is now possible to perform a trimming operation as described above and any other flight preparations may now be performed.

As described above, in FIG. 5B the steering air chambers K1 reduce their volume as the atmospheric outer pressure falls when the airship rises. FIG. 5B illustrates how the walls of the chamber K1 fall downwardly without a controlled folding as shown at K1'. Such an uncontrolled folding can be avoided by the feature of the above mentioned elastic suspension H securing the apex of the chamber K1 to the beam L1 so that the side walls of the chamber can fold as shown at K1". The suspensions H may, for example, be formed by rubber ropes, a plurality of which would be distributed along the length of the beam L1. The suspension of the chambers K1 is not limited to the example shown. Different portions of the frame structure can be used for holding the side walls of the chambers K1 so that a controlled folding is assured when the external atmospheric pressure falls. For example, the cross-rib elements Q1 and Q2 could be used for this purpose or even the diagonal tensioning elements would be suitable to control the folding of the side walls of the chambers K1. Similarly, the securing of the holding elements to the chamber walls of the chambers K1 can be modified and it is not necessary to suspend the apex as shown in FIG. 5C to assure a controlled folding.

Figure 7:
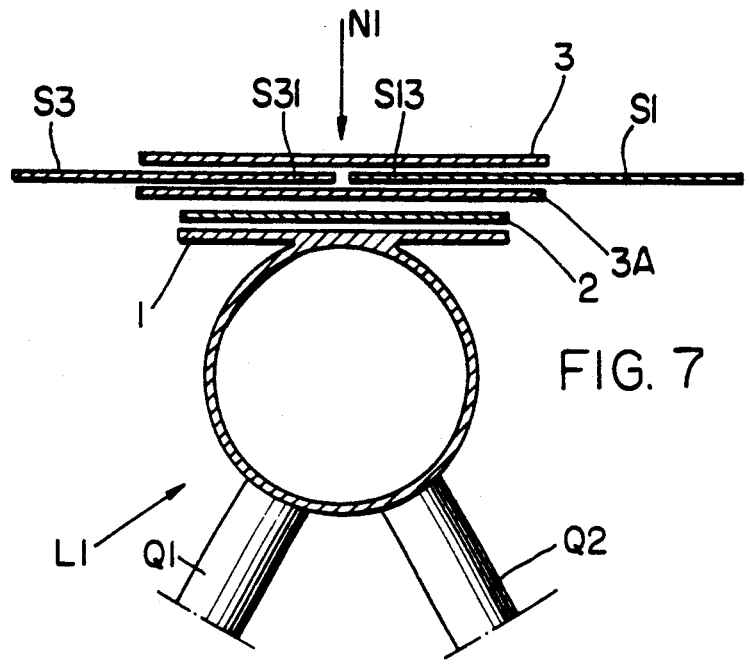
FIG. 7 is a section through a vertical plane perpendicularly to the length axis of the top longitudinal beam and showing the seam construction as well as the connection of the seam to the longitudinal beam.
Figure 8:
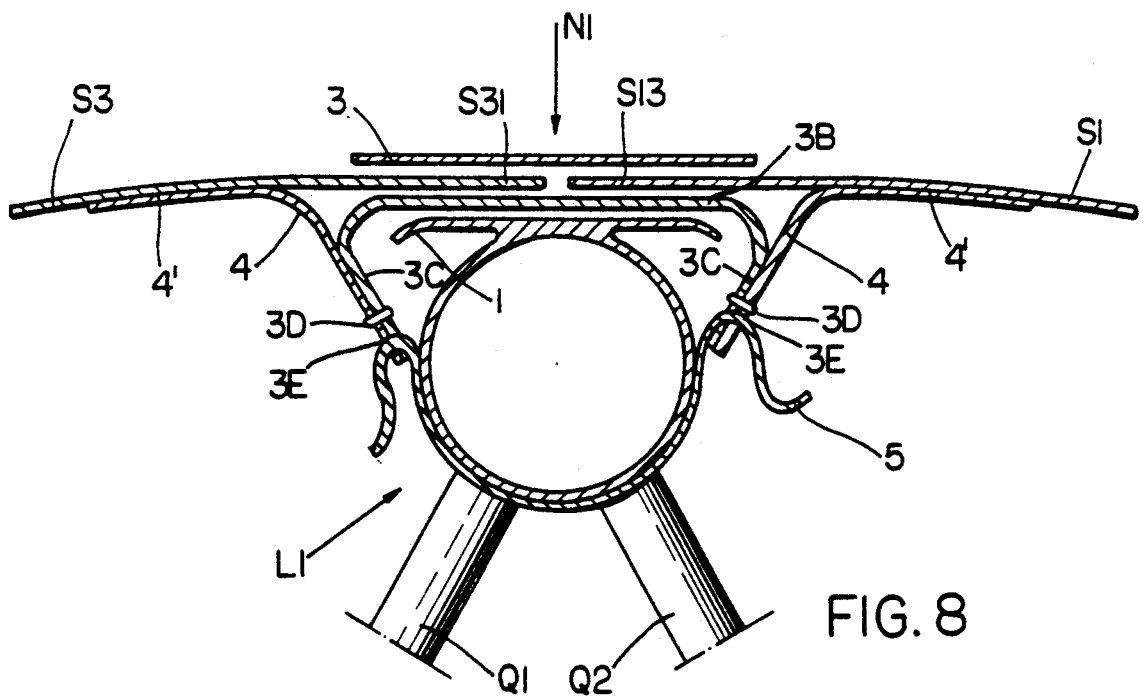
FIG. 8 is a view similar to that of FIG. 7, but showing a different connection and seam formation.
Figure 9:
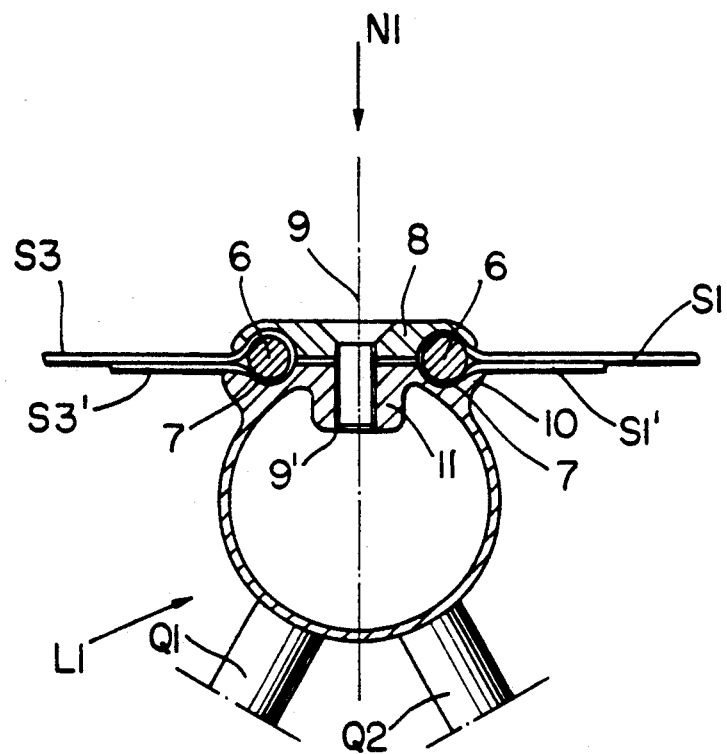
FIG. 9 is a sectional view similar to that of FIGS. 7 and 8 illustrating a third embodiment of the connection and formation of a seam.

FIGS. 7, 8, and 9 illustrating several embodiments for securing the skin segments in a force transmitting manner to the frame structure and to each other will now be described. These figures also illustrate formation of the attachment seams N1, N2, N3 between neighboring skin sections S1 and S3. The connection along the beams L2 and L3 to form the respective seams is identical to the seam N1 shown in FIGS. 7, 8, and 9, and therefore not separately illustrated.

Referring to FIG. 7, the longitudinal beam L1 comprises a radially outwardly facing flat chord 1 forming a mounting surface for the respective attachment seam N1. An adhesive film or bonding strip 2 is secured to the radically outwardly facing mounting surface of the chord 1 forming part of the rigid beam L1. A sealing strip 3A that may be a Velcro ® strip is placed on top of the adhesive film or strip 2 then the edge S13 of the skin segment S1 and the edge S31 of the skin segment S3 are placed next to each other and in abutting relationship along the rigid beam L1 on the sealing strip 3A. If strip 3A is a Velcro ® strip, then edges S13, S31 will be corresponding Velcro ® strips. Next, an outer sealing strip 3 is placed on the abutting seam. The strips 3 and 3A also have adhesive characteristics and the attachment seam N1 is formed as a gas-tight seal. Adhesives for this purpose are well known in the art. Adhesives and Velcro ® strips form a force transmitting connection between the envelope and the longitudinal rigid beams.

As mentioned, instead of using adhesive strips forming a permanent bond, it is also possible to use other connector means, for example, hook and loop strips known under the Trademark "velcro ®". Such velcro connectors are capable of providing a gas-tight seal, yet facilitate greatly the removal of the skin segments. In any of these connections, the attachment seams N1, N2, and N3 are properly tensioned in the longitudinal direction along the length of the respective rigid beam L1, L2, and L3, while the tensioning in the circumferential direction is only accomplished during the filling of the envelope with the carrier gas.

FIG. 8 illustrates a similar view as FIG. 7, however with a modified seam construction. Gusset strips 4 are adhesively bonded at 4' alongside the edges S13 and S31. The free edges of these gusset strips 4 reach inwardly toward the beam L1. The connector or sealing strip 3A has been replaced by a similar strip 3B which has inwardly curving extension margins 3C which are joined to the free edges of the gusset strips 4 at 3D, for example, by an adhesive bond or other suitable connection. Eyelets 3E are provided along the free rim of the interconnected free edges and margins 3C. A lashing rope 5 passes through these eyelets 3E for securing the skin to the beam L1 in a force transmitting manner whereby the radially outwardly facing surface of the chord 1 of the rigid beam L1 again forms a mounting surface for the attachment seam N1. The formation of the attachment seam N1 also includes the above mentioned cover strip 3 which provides a gas-tight bond between the edges S13 and S31 in cooperation with the bonding and sealing strip 3D. The connection 3D may also be of a releasable kind, for example, by means of velcro ® strips.

FIG. 9 shows still another embodiment of a seam formation, wherein the beam L1 is provided with a reinforced upwardly facing beam section 11 forming a radially outwardly facing mounting surface having two grooves 7 extending in parallel to each other along the length of the beam L1. Additionally, threaded holes 9' are provided in the beam section 11. The skin segment S1 is provided with a loop S1'. Similarly, skin segment S3 is provided with a loop S3'. Each loop is reinforced by an insert strip 6, for example, of elastic sealing material. Thus, the widened margins of the skin segments S1 and S3 are received in the grooves 7. The skin segments are held in place by a cover plate 8 provided with similar grooves for cooperation with the grooves 7 and with through-holes for screws 9 engaging the threaded holes 9'. When the screws 9 are tightened a force transmitting connection between the beams L1, L2, L3 and the envelope is formed. This type of connection is also readily formed and loosened again. Therefore, especially the seam .N2 is suitable for this type of connection, since by providing the cover plate 8 in sections, selective access may be provided to the interior of the airship, either along a certain section or along the entire length of the airship. If desired, a sealant 10 may be placed in the grooves 7 which also hold the margins with the reinforcing strip 6. Another sealing strip as shown at 3 in FIGS. 7 and 8 may be placed between the beam section 11 and the cover plate 8.

By constructing the envelope of several skin segments as taught by the invention, it is possible to easily form the envelope. Especially, only a longitudinal tensioning of the seams along the respective frame beams is necessary, while the tightening in the circumferential direction is accomplished by the carrier gas. Due to the fact that the skin in the circumferential direction does not require any tightening, the mounting of the skin segments is greatly facilitated. Additionally, the strength characteristics of the entire airship are improved for the reasons set forth above. The filling sequence is also easily performed as described above and the control and trimming operations can simply be performed even during flight.

It has been stated above that the chambers K1 and K2 are filled with air for practical reasons. However, helium or other suitable gases may be used in chambers K2. Similarly, the carrier gas in the envelope need not be helium. Any other suitable carrier gas may be used.

Conventional materials for forming the chambers K1 and K2 may be used. For instance, the material needed for the skin of the chambers K1 and K2 could include a laminated structure of polyester materials, e.g. Mylar ®, forming a gas seal coating laminated to a backing of fabric Dacron ®. The envelope is of a similar construction but with an additional layer made of Tedlar ®, provides additional strength, UV light and weather resistance, and longer operational life. The masses of suitable materials of this type are within the range of about 200 to 250 grams/m$^2$. The masses of the skins for chambers K1 are about 200 grams/m$^2$ and for K2 are about 50 gr/m$^2$.

Although the invention has been described with reference to specific example embodiments, it will be appreciated that it is intended to cover all modifications and equivalents within the scope of the appended claims.

What I claim is:

1. A rigid airship with a carrier frame of ribs and beams enclosed by an envelope, comprising rigid cross-ribs and a first plurality of longitudinal rigid beams interconnecting said rigid cross-ribs to form said carrier frame, each of said longitudinal rigid beams having a mounting surface facing radially outwardly relative to said airship, a second plurality of longitudinal skin segments (S1, S2, S3) corresponding in number to said first plurality of rigid longitudinal beams, said skin segments forming together said envelope as an airship configuration in an inflated condition, each skin segment having longitudinal edges so cut that joint edges of neighboring skin segments form an attachment seam substantially along the entire length of said airship, means rigidly securing each attachment seam in a force transmitting manner to a respective mounting surface of said longitudinal rigid beams, and wherein said rigid beams and said envelope rigidly secured with its attachment seams to said rigid beams form together a load distribution system so that tension stress in said envelope is superimposed on any compression stress occurring in said rigid cross-ribs and in said longitudinal rigid beams, whereby said compression stress is at least partly compensated and correspondingly reduced, said airship further comprising steering air chamber means (K1) arranged in said carrier frame for trimming said airship, and means connected to said steering air chamber means (K1) for controlling an air pressure in said steering air chamber means (K1) for said trimming.

2. The airship of claim 1, wherein said envelope forms a single carrier gas chamber extending from bow to stern of said airship.

3. The airship of claim 1, wherein said steering air chamber means (K1) are surrounded by carrier gas, and wherein the total volume of said steering air chamber means (K1) in their inflated state corresponds to about 25% to about 33% of the entire volume of said envelope of said airship.

4. The airship according to claim 1, wherein said means for controlling an air pressure comprise means for adjusting and maintaining a constant, selectable differential pressure between the steering air chamber means (K1) and the atmospheric pressure.

5. The airship of claim 4, wherein said steering air chamber means comprise two steering air chambers, and wherein said adjusting and maintaining means comprise pressure control means individually for each steering air chamber (K1) for individually and separately controlling the air pressure in said steering air chambers.

6. The airship of claim 1, wherein at least two of said plurality of skin segments are secured along their edges to form said attachment seam prior to mounting said skin segments to said carrier frame of said airship.

7. The airship of claim 1, wherein at least one of said seams is constructed as a resealable seam.

8. The airship of claim 7, wherein said resealable seam comprises Velcro® strips.

9. The airship of claim 8, further comprising sealing means (10) in the longitudinal seams between said skin segements and the respective beam chord.

10. The airship of claim 7, wherein longitudinal edges of said skin segments comprise means for tying said segments to said longitudinal beams.

11. The airship according to claim 7, wherein longitudinal edges of said skin segments form a loop in which a reinforcing strip (6) is received, and wherein san outer chord of the respective longitudinal beam comprises a reinforcement section (11) forming said radially outwardly facing mounting surface including first means for holding said loop with said reinforcing strip to hold said skin segments, said means for securing further comprising a clamping cover plate (8) running alongside edge zones forming said loops, said cover plate having second means cooperating with said first means for holding said reinforcing strip (6), and means (9) for connecting said clamping cover plate (8) with said longitudinal chord of the respective longitudinal frame beam in a force transmitting and releasable manner.

12. The airship of claim 11, wherein said first and second means for holding comprise grooves for receiving at least part of said reinforcing strip (6).

13. The airship of claim 1, further comprising elastic suspension means (H) for suspending said steering air chamber means (K1) in said carrier frame for assuring a controlled folding of said steering air chamber means, when air is removed therefrom.

14. The airship of claim 13, wherein said steering air chamber means have a triangular cross-section, and said elastic suspension means are arranged at an apex of said respective steering air chamber means for securing said apex to an upper longitudinal frame beam.

15. The airship of claim 1, wherein said cross-ribs form triangles, wherein said first plurality comprises three beams one at each corner of said triangles, and wherein said second plurality comprises three skin segments forming three seams running along said three beams.

16. The airship of claim 15, wherein said steering air chamber means (K1) have a triangular cross-section sized to fill a triangular rib surface, each steering air chamber means having side walls and a floor wall, said floor wall facing a rectangular frame surface enclosed by two neighboring rib elements and by two neighboring beam elements, said airship further including means (B) for lashing said floor wall at least to said neighboring rib elements.

17. The airship of claim 1, wherein said steering air chamber means comprise two steering air chambers (K1), one of which is arranged near the bow and the other near the stern of said airship.

18. A rigid airship with a carrier frame of rigid ribs and rigid beams enclosed by an envelope, comprising rigid cross-ribs and a first plurality of longitudinal rigid beams interconnecting said rigid cross-ribs to form said rigid carrier frame, each of said longitudinal rigid beams having a mounting surface facing radially outwardly relative to said airship, a second plurality of longitudinal skin segments (S1, S2, S3) corresponding in number to said first plurality of rigid longitudinal beams, said skin segments forming together said envelope as an airship configuration in an inflated condition, each skin segment having longitudinal edges so cut that joint edges of neighboring skin segments form an attachment seam substantially along the entire length of said airship, means rigidly securing each attachment seam in a force transmitting manner to a respective mounting surface of said longitudinal rigid beams, and wherein said rigid beams and said envelope rigidly secured with its attachment seams to said rigid beams form together a load distribution system so that tension stress in said envelope is superimposed on any compression stress occurring in said rigid cross-ribs and in said longitudinal rigid beams, whereby said compression stress is at least partly compensated and correspondingly reduced, said rigid airship further comprising steering air chamber means (K1) arranged in said carrier frame for trimming said airship, and means connected to said steering air chamber means (K1) for controlling an air pressure in said steering air chamber means (K1) for said trimming, said rigid airship further comprising, in addition to said steering air chamber means (K1) at least one further air chamber (K2) is arranged in the same manner as said steering air chamber means, and means (12) for inflating and deflating said further air chamber (K2) independently of any inflating and deflating of said steering air chamber means (K1).

19. The airship of claim 18, further comprising means for securing said steering air chamber means (K1) and said further air chambers (K2) to said carrier frame.

20. The airship of claim 19, wherein said securing means comprise a net (Z) and means for tying or lashing said net to said carrier frame.

21. The airship according to claim 19, wherein said ribs and beams enclose rectangular surfaces, and wherein said securing means are arranged at least at corners of said rectangular surfaces where respective base rib elements are interconnected with corresponding longitudinal beam elements.

* * * * *

UNITED STATES PATENT AND TRADEMARK OFFICE
CERTIFICATE OF CORRECTION

PATENT NO.   : 5,285,986
DATED        : Feb. 15, 1994
INVENTOR(S)  : Klaus Hagenlocher It is certified that error appears in the above-identified patent and that said Letters Patent is hereby corrected as shown below:

Column 14, line 3, replace "san" by --an--;
Column 14, line 10, after "edge zones" insert --of said skin segments and reaching over said edge zones--.

Signed and Sealed this

Fourteenth Day of June, 1994

Attest:

BRUCE LEHMAN

Attesting Officer

Commissioner of Patents and Trademarks